(12) United States Patent
Lammers et al.

(10) Patent No.: US 11,724,343 B2
(45) Date of Patent: Aug. 15, 2023

(54) REPAIR OF COATED COMPONENTS USING DESIGN ADAPTATION

(71) Applicant: Siemens Energy Global GmbH & Co. KG, Bayern (DE)

(72) Inventors: Heiko Lammers, Leipzig (DE); Daniel Vöhringer, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/773,102

(22) PCT Filed: Oct. 12, 2020

(86) PCT No.: PCT/EP2020/078545
§ 371 (c)(1),
(2) Date: Apr. 29, 2022

(87) PCT Pub. No.: WO2021/094042
PCT Pub. Date: May 20, 2021

(65) Prior Publication Data
US 2022/0410325 A1 Dec. 29, 2022

(30) Foreign Application Priority Data
Nov. 14, 2019 (DE) ..................... 10 2019 217 580.5

(51) Int. Cl.
*B23P 6/00* (2006.01)

(52) U.S. Cl.
CPC .............. *B23P 6/007* (2013.01); *B23P 6/002* (2013.01); *Y10T 29/49318* (2015.01); *Y10T 29/49737* (2015.01)

(58) Field of Classification Search
CPC ......... Y10T 29/49318; Y10T 29/49339; Y10T 29/49737; Y10T 29/49734; Y10T 29/49732; B23P 6/002; B23P 6/007
See application file for complete search history.

(56) References Cited

U.S. PATENT DOCUMENTS 10,024,161 B2 * 7/2018 McCall .................... F01D 5/20
11,504,813 B2 * 11/2022 Whittle ................... F01D 17/08
(Continued)

FOREIGN PATENT DOCUMENTS

DE 102017208106 A1 11/2018
EP 1316389 A2 6/2003
(Continued)

OTHER PUBLICATIONS

PCT International Search Report and Written Opinion of International Searching Authority dated Feb. 8, 2021 corresponding to PCT International Application No. PCT/EP2020/078545 filed Oct. 12, 2020.

*Primary Examiner* — Jason L Vaughan
(74) *Attorney, Agent, or Firm* — Wolter Van Dyke Davis, PLLC

(57) ABSTRACT

A method for repairing an at least externally coated hollow component. The direct mechanical machining of a coated component after use removes the need for a coating-removal and selective hollowing step and a selective repair of cracks, since a design adaptation leads to a component being engineered or used such that it can be used again as a result of external dimensional stipulations.

14 Claims, 1 Drawing Sheet

(56) References Cited

U.S. PATENT DOCUMENTS

| | | | |
|---|---|---|---|
| 2003/0100242 A1* | 5/2003 | Annigeri | B24B 19/14 451/41 |
| 2003/0167616 A1 | 9/2003 | Harding et al. | |
| 2007/0039176 A1* | 2/2007 | Kelly | C23C 28/3455 29/402.09 |
| 2007/0202269 A1* | 8/2007 | Potter | C23C 28/3455 427/140 |
| 2010/0126014 A1* | 5/2010 | Gupta | B23P 6/007 29/889.1 |
| 2020/0173936 A1 | 6/2020 | Vohringer et al. | |

FOREIGN PATENT DOCUMENTS

| | | |
|---|---|---|
| EP | 1752559 A2 | 2/2007 |
| EP | 1889680 A1 | 2/2008 |
| EP | 1950320 A1 | 7/2008 |
| EP | 3053702 A2 | 8/2016 |
| JP | 2001303903 A | 10/2001 |
| WO | 2008154940 A1 | 12/2008 |

* cited by examiner

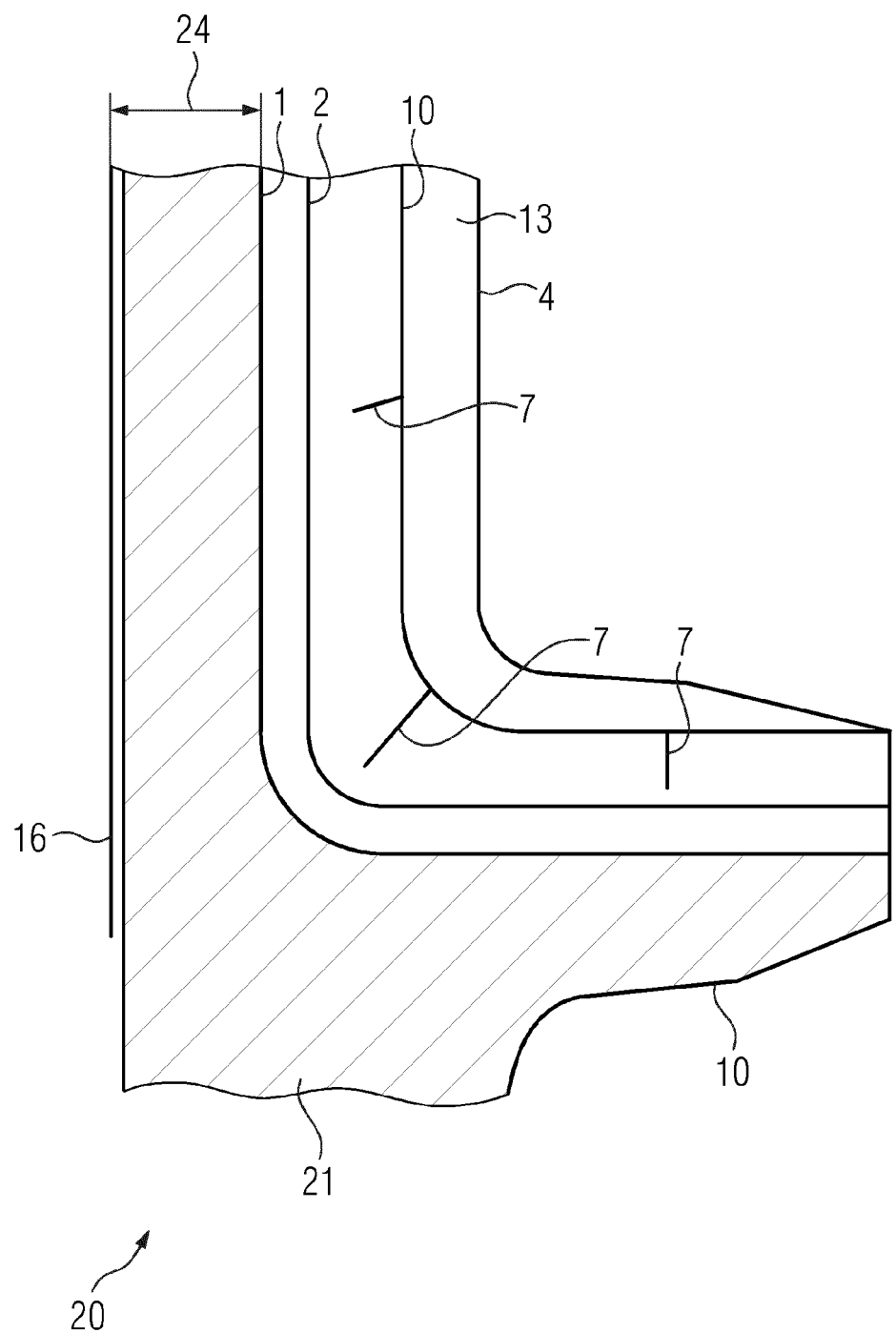

REPAIR OF COATED COMPONENTS USING DESIGN ADAPTATION

CROSS REFERENCE TO RELATED APPLICATIONS

This application is the US National Stage of International Application No. PCT/EP2020/078545 filed 12 Oct. 2020, and claims the benefit thereof. The International Application claims the benefit of German Application No. DE 10 2019 217 580.5 filed 14 Nov. 2019. All of the applications are incorporated by reference herein in their entirety.

FIELD OF INVENTION

The invention relates to the repair of components having an externally coated substrate, on which the coating is still present and there may be cracks present in the substrate.

BACKGROUND OF INVENTION

Vital to successful digitization in turbine blade repair is an extensive automation of manufacture. Current approaches eliminate only isolated conventional operations, which they attempt to replace by a robot or by an automated manufacturing unit. This approach is costly and inconvenient, as a great number of manufacturing and testing units must be acquired; it is not particularly productive, and it is complex to implement, since it gives rise to an unnecessarily large number of interfaces between machines.

SUMMARY OF INVENTION

Solving the above problem is an object of the invention. The object is achieved by means of a method as claimed. The dependent claims list further advantageous measures, which may be combined as desired with one another in order to achieve further advantages.

BRIEF DESCRIPTION OF THE DRAWINGS

The FIGURE shows, schematically, the procedure of the invention.

DETAILED DESCRIPTION OF INVENTION

The FIGURE and description represent only exemplary embodiments of the invention.

The repair operates in particular as follows:

Preparation:

An advantageous automatic blasting unit ablates ceramic residues of a layer 13, such residues being advantageously present, of a component 20. This leaves only a used MCrAlY (MCrAlY contour line 4) on a substrate 21, with the original contour line 10 of the component 20.

The surface of the component 20 is now purely metallic, this being important for further measurements. For the further manufacturing steps as well, furthermore, it may be important to separate ceramic layer components and metal, if present.

The ceramic layer or ceramic layer parts may alternatively be left on the substrate 21, for removal together with the MCrAlY in the same operation. The same applies to the TGO which has formed from the MCrAlY.

By means of suitable scanning, more particularly water jet ultrasound or laser beam ultrasound or CT etc., especially in a zero-point clamping system, a precise image is generated, with the position of the interior contour 16 of the substrate 21. In this way, together with an exterior scan, especially by means of structured light projection, laser scanning, etc., advantageously in the same zero-point clamping system, a precise 3D model of the present component in space is obtained.

Scanning of the exterior contour or of the MCrAlY contour 4 takes place in particular with root in the zero-point clamping system, and scanning of the interior geometry with root in the zero-point clamping system, to obtain a precise position of the blade as a 3D model with interior contour in the zero-point clamping system.

Then, using this model, based on the interior contour 16, a target component, in the present case a turbine blade, with minimum contour 1, based on a minimum-allowable minimum wall thickness 24, is generated.

An add on for manufacturing and/or for tolerances, this being the tolerance contour 2, is added to the minimum contour 1.

The measuring tolerances of the interior contour 16 are advantageously added onto the external tolerance machining and measurement, since there is only external machining.

This model, together with the scan and the component 20 in the zero-point clamping system, then makes it possible to machine the component 20, in particular by grinding, cutting, milling, etc., in such a way as to produce the desired target geometry=tolerance contour 2.

In this way the layer 13 is ablated and the substrate 21 is at the same time repaired, in that, optionally, all cracks 7 in the substrate 21 that can be machined are also machined out.

A further massive advantage is the possibility thus for the first time of being able actually to repair findings in the radius. The accuracy of a mechanical process allows the radius here to be moved slightly backward and downward, without influencing the radius geometry.

It would additionally be possible for all welding preparations to take place at the same time. Because the component is clamped in a zero-point clamping system, these data can be transmitted directly to the welding unit.

After welding has taken place, the weld seams can be machined again with the machine data on the mill or grinding machine, particularly for smoothing and/or adaptation to the final geometry.

After that, the substrate 21 thus machined need only be coated again.

Summary:

Optional blast removal of the TBC→scanning/interior/exterior→compilation of a target model of the blade→ablative machining to target dimensions→welding of the component→machining of the weld seams to final contour→coating.

This advantageous approach would bring together the following processes in one:

Removal of the TBC, TGO if there is no blasting of the ceramic

Removal of the MCrAlY—there would no longer be any acid baths required

Masking of the roots and protection of the interior blade for coating removal

Intermediate blasting during coating removal

Blasting of the blade vane

Residual layer grinding

Heat tint

Manual mechanical repair (grinding of findings)

Documentation of findings

Removal of the rubbing edge

Welding preparations

The advantages are as follows:

The operations of coating removal, masking, repair, welding preparation, residual layer grinding, etc. become obsolete in one step, cost saving through process streamlining, a greater number of components can be saved, since repair in the radius and platform is enabled, all possible with present-day equipment, lifetime calculations become easier, since it is necessary only to determine a residual wall thickness, and there is no longer a need for complicated crack propagation calculations, by the reference to the clamp and to the blade foot, the position in space can be switched directly via machine data between the processing stations, and no repeated scans are required.

The invention claimed is:

1. A method for repairing an at least externally coated hollow component, wherein the component comprises a substrate, where the substrate comprises at least one layer, where the at least one layer constitutes a metallic and/or ceramic coating, where the substrate optionally comprises cracks, the method comprising:

measuring an interior contour and an exterior contour of the hollow component, comprising a wall thickness, and stipulating a minimum wall thickness through a design adaptation or a design verification whether a minimum contour having the minimum wall thickness is present, where the minimum contour permits renewed use of an overhauled component having this minimum wall thickness, and mechanical machining of the component, which comprises the substrate and the coating, until a tolerance contour is obtained, without prior coating removal, and optionally ablating material of the substrate, to remove cracks.

2. The method as claimed in claim 1, further comprising: first removing a ceramic layer or ceramic layer parts of the layer.

3. The method as claimed in claim 1, wherein a ceramic layer or ceramic layer parts of the layer are not removed separately during the repair.

4. The method as claimed in claim 1, wherein cracks in the substrate are welded.

5. The method as claimed in claim 4, wherein cracks in the substrate are welded after the ablation of material of the substrate.

6. The method as claimed in claim 1, wherein after removal of the coating and optional repairs, coating takes place again.

7. The method as claimed in claim 6, wherein the optional repairs comprise welding of cracks.

8. The method as claimed in claim 1, wherein a component is machined, and by reference to a clamp, a position in space can be switched directly via machine data between processing stations of measurement, coating, and welding, so that there is no need for repeated scans for referencing.

9. The method as claimed in claim 8, wherein the component comprises a turbine blade.

10. The method as claimed in claim 9, wherein by reference to a blade root of the turbine blade, the position in space can be switched directly.

11. The method as claimed in claim 1, wherein measuring the interior contour comprises one or more of ultrasound, ultrasound with water jet coupling, laser excitation, immersion methods, computed tomography, and x-ray-based computed tomography.

12. The method as claimed in claim 1, wherein measuring the exterior contour comprises structured light projection and/or laser scanning.

13. The method as claimed in claim 1, wherein, in the design adaptation, a minimum wall thickness is defined by: an interior contour of the internal geometry of the component and by an external minimum contour, with minimum-allowable minimum wall thickness of the substrate, where an add on for manufacturing and/or measuring tolerances, defined by the tolerance contour, is added to the minimum contour.

14. The method as claimed in claim 1, wherein ablating material of the substrate to remove cracks comprises mechanical machining.

* * * * *